US008761677B2

(12) United States Patent
Kim et al.

(10) Patent No.: US 8,761,677 B2
(45) Date of Patent: Jun. 24, 2014

(54) MULTIPLE STAGE HYBRID SPECTRUM SENSING METHODS AND SYSTEMS FOR COGNITIVE RADIO (75) Inventors: Kyungtae Kim, West Windsor, NJ (US); Yan Xin, Princeton, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 169 days.

(21) Appl. No.: 13/408,175

(22) Filed: Feb. 29, 2012

(65) Prior Publication Data
US 2012/0238267 A1    Sep. 20, 2012

Related U.S. Application Data (60) Provisional application No. 61/452,750, filed on Mar. 15, 2011.

(51) Int. Cl.
H04B 15/00    (2006.01)
H04B 17/00    (2006.01)

(52) U.S. Cl.
USPC ......... 455/62; 455/63.1; 455/434; 455/67.11; 455/67.13; 455/161.2; 375/240.21; 375/333

(58) Field of Classification Search
USPC ......... 455/62, 63.1, 434, 67.11, 67.13, 161.2; 375/240.21, 333; 702/181
See application file for complete search history.

(56) References Cited

U.S. PATENT DOCUMENTS

| 8,184,653 | B2 * | 5/2012 | Dain et al. | 370/431 |
| 8,184,656 | B2 * | 5/2012 | Chandra et al. | 370/445 |
| 8,184,657 | B2 * | 5/2012 | Dacosta | 370/464 |
| 8,254,393 | B2 * | 8/2012 | Horvitz | 370/395.41 |
| 8,290,503 | B2 * | 10/2012 | Sadek et al. | 455/452.1 |
| 8,326,313 | B2 * | 12/2012 | McHenry et al. | 455/454 |
| 8,442,445 | B2 * | 5/2013 | Mody et al. | 455/67.11 |
| 8,565,811 | B2 * | 10/2013 | Tan et al. | 455/550.1 |

OTHER PUBLICATIONS

IEEE Standards Association. "Part 22: Cognitive Wireless RAN Medium Access Control (MAC) and Physical Layer (PHY) Specifications: Policies and Procedures for Operation in the TV Bands" IEEE Standard 802.22. Jul. 2011. (672 Pages).

Kim, H., et al. "In-Band Spectrum Sensing in IEEE 802.22 WRANS for Incumbent Protection" IEEE Transactions on Mobile Computing. vol. 9, No. 12. Dec. 2010. pp. 1766-1779.

(Continued)

Primary Examiner — Marceau Milord
(74) Attorney, Agent, or Firm — Joseph Kolodka (57) ABSTRACT Systems and methods for detecting unused channels in a cognitive radio system are described. In one method, data is communicated on a particular channel for a secondary receiver. In addition, a set of channels is iteratively scanned by collecting samples for each channel and for each iteration of the scanning. Here, iterations of the scanning progressively removes channels from the set of channels based on the collected samples and updates states of the channels in the set based on the collected samples to obtain a set of candidate channels. In response to detecting a pre-determined condition, communications on the particular channel are precluded and at least one of the candidate channels is evaluated by collecting additional samples on each of the channels. Further, at least one of the candidate channels is selected based on the evaluation for utilization by the one or more secondary receivers for data communication.

14 Claims, 5 Drawing Sheets

(56) References Cited

OTHER PUBLICATIONS

Kim, K., et al. "PG-Sensing:Progressive Out-of-Band Spectrum Sensing for Cognitive Radio" IEEE Global Communications Conference (GLOBECOM). Dec. 2011. (5 Pages).

Liu, X., et al. "Escape: A Channel Evacuation Protocol for Spectrum-Agile Networks" IEEE Symposium on New Frontiers in Dynamic Spectrum Access Networks. Apr. 2007. pp. 292-302.

Luo, L., et al. "Joint Optimization of Spectrum Sensing for Cognitive Radio Networks" Global Communications Conference (GLOBECOM). Dec. 2010. (5 Pages).

Min, A., et al. "Detection of Small-Scale Primary Users in Cognitive Radio Networks" IEEE Journal on Selected Areas in Communications. vol. 29, No. 2. Feb. 2011. pp. 349-361.

Willkomm, D. "Spectrum Efficient QOS Support for Secondary Users in Cognitive Radio Systems." TKN Technical Reports Series. Dec. 2009. (27 Pages).

Xin, Y., et al. "B-SSCT: A Block Sequential Spectrum Sensing Scheme for Cognitive Radio" 6th International ICST Conference on Cognitive Radio Oriented Wireless Networks and Communications (CROWNCOM). Sep. 2011. pp. 16-20.

Xin, Y., et al. "SSCT: A Simple Sequential Spectrum Sensing Scheme for Cognitive Radio" IEEE Global Communications Conference (GLOBECOM). Dec. 2009. (6 Pages).

Xin, Y., et al. "Efficient Channel Search Algorithms for Cognitive Radio in a Multichannel System" IEEE Global Communications Conference (GLOBECOM). Dec. 2010. (5 Pages).

Yucek, T., et al. "A Survey of Spectrum Sensing Algorithms for Cognitive Radio Applications" IEEE Communications Surveys and Tutorials. vol. 11, No. 1. First Quarter 2009. pp. 116-130.

\* cited by examiner

MULTIPLE STAGE HYBRID SPECTRUM SENSING METHODS AND SYSTEMS FOR COGNITIVE RADIO

RELATED APPLICATION INFORMATION

This application claims priority to provisional application Ser. No. 61/452,750 filed on Mar. 15, 2011, incorporated herein by reference.

BACKGROUND

1. Technical Field

The present invention relates to cognitive radio systems and methods and, more particularly, to spectrum sensing for cognitive radio.

2. Description of the Related Art

In cognitive radio (CR) networks, secondary users (SUs) are permitted to opportunistically access a licensed spectrum band or channel at times that the band or channel is not occupied by primary users (PUs). An important aspect of CR networks is the maintenance of the quality of service (QoS) of secondary transmissions while ensuring that that the secondary transmissions do not interfere with primary user (PU) transmissions on the licensed band. To avoid causing harmful interference to PUs, SUs should reliably detect the return of PUs and quickly evacuate from the spectrum band occupied by the SUs. However, to maintain QoS of secondary traffic, SUs should quickly switch to another empty spectrum band that is not utilized by any PUs.

SUMMARY

One embodiment is directed to a method for detecting at least one channel that is unused by a PU in a cognitive radio system. In accordance with the method, data is communicated on a particular channel for at least one secondary receiver. In addition, a set of channels is iteratively scanned by collecting samples for each channel in the set of channels and for each iteration of the scanning. Here, iterations of the scanning progressively removes channels from the set of channels based on the collected samples and updates states of the channels in the set based on the collected samples to obtain a set of candidate channels. In response to detecting a pre-determined condition, communications on the particular channel are precluded and at least one of the candidate channels is evaluated by collecting additional samples on each of the channels. Further, at least one of the evaluated candidate channels is selected based on the evaluation for utilization by the one or more secondary receivers for data communication.

An alternative embodiment is directed to a computer readable storage medium comprising a computer readable program for detecting at least one channel that is unused by a primary user in a cognitive radio system. The computer readable program when executed on a computer causes the computer to perform a plurality of steps. The steps include iteratively scanning a set of channels by collecting samples for each channel in the set of channels and for each iteration of the scanning. Iterations of the scanning progressively removes channels from the set of channels based on the collected samples and updates states of the channels in the set based on the collected samples to obtain a set of candidate channels. The steps further include, in response to detecting a pre-determined condition, precluding communications on a particular channel used to communicate data for at least one secondary receiver and evaluating at least one of the candidate channels by collecting additional samples on each of the channels. The steps further include selecting at least one of the evaluated candidate channels based on the evaluation for utilization by the at least one secondary receiver for data communication.

Another embodiment is directed to a cognitive radio secondary user system that includes a transmitter device, a scanner module and a searcher module. The transmitter device is configured to transmit data on a particular channel. In addition, the scanner module is configured to iteratively scan a set of channels by collecting samples for each channel in the set of channels and for each iteration of the scan. Iterations of the scan progressively removes channels from the set of channels based on the collected samples and updates states of the channels in the set based on the collected samples to obtain a set of candidate channels. The searcher module is configured to, in response to detecting a pre-determined condition, preclude communications on the particular channel and evaluate at least one of the candidate channels by collecting additional samples on each of the at least one of the channels. The searcher module is further configured to select at least one of the evaluated candidate channels based on the evaluation to direct the transmitter device to transmit data transmissions on the selected channel(s).

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Aspects of the present principles described herein enable quick and accurate identification of a free spectrum band for a secondary user in a multi-band cognitive radio system when the spectrum band currently occupied by the SU system becomes unavailable due to activities on the band by primary users. In the description provided herein, a spectrum band and spectrum channel are used interchangeably. Thus, for purposes of this disclosure, a "channel" and a "band" are interchangeable.

Spectrum sensing is an important function for enabling CR networks to maximize spectrum utilization or QoS for SUs without causing harmful interference to PUs or negatively affecting the QoS for PUs. For this purpose, two types of spectrum sensing, namely in-band sensing and out-of-band sensing, are considered jointly. In-band sensing is performed to detect the return of the PU to the channel currently used by an SU system. In many cases of practical interest, non-feature detection methods are employed by SUs. In such cases, SUs are not able to perform in-band sensing and data transmissions at the same time at the same channel. Generally, no data transmission of an SU system on the spectrum band to be sensed is permitted for the duration of the sensing process. Accordingly, a periodic sensing structure, in which a sensing/ quite period (SP) is followed by a transmission period (TxP), can be employed to enable primary signal detection in an SP while achieving opportunistic spectrum sharing during a TxP. An SU system performs in-band sensing to detect the presence/absence of PUs at the currently occupied spectrum band during periodic SPs.

During out-of-band sensing, the SU system measures other channels to determine the channel availability for future use. In general, it is practically infeasible for an SU system to perform out-of-band sensing for all possible candidate channels simultaneously in a single operation due to the potentially large number of channels and the limited hardware capability of the sensing device. The out-of-band spectrum sensing process is composed of two phases: spectrum scanning and spectrum searching. The goal of the spectrum scanning is to quickly remove the presumably occupied spectrum bands identified easily with strong signals while maintaining for further consideration a small list of spectrum bands that are more likely to be unused. Spectrum searching is performed when it is deemed that the secondary user should evacuate a channel it currently occupies. Here, spectrum searching can be implemented to determine the best, or adequate, spectrum band that meets the quality of service specifications over all available spectrum bands so that the SU system can switch to this band after spectrum evacuation. It can be assumed that an SU system has a single detector, which can only observe one channel at one time. At a low signal-to-noise ratio (SNR), spectrum sensing consumes a large number of samples in order to obtain reliable sensing results. Because the number of candidate channels is typically large, sensing these channels in a low SNR regime is a time-consuming process. In particular, the channel searching process is usually time critical to avoid QoS degradation to secondary communications.

Although there has been considerable research in spectrum sensing in CR networks, an important issue of how to manage sensing resources in out-of-band sensing operations to enable quick and accurate channel switching has not been addressed adequately in existing literature. Most existing works focus on either scanning or searching. Here, scanning refers to the process in which secondary users determine states of all the candidate spectrum bands while searching refers to the process in which secondary users locate an empty spectrum band. Each of these works assume that the states of candidate spectrum bands remain invariant during either scanning or searching process. In practice, however, the states of candidate spectrum bands may change at any time.

In accordance with exemplary aspects of the present principles, embodiments can employ a multiple stage hybrid spectrum sensing scheme that includes three components. Firstly, embodiments can employ a repeated SSCT in-band sensing, which permits a quick detection of the return of PUs. Secondly, a progressive out-of-band channel scanning can be applied. Advantageously, the scanning adaptively allocates sensing resources to a reduced list of the promising spectrum bands. Thus, during a limited period of time in which a secondary user is able to scan for potentially empty channels, the scanning process progressively reduces the size of the list of candidates and devotes additional resources to each potential channel as the list is refined. Furthermore, during the refining process, states of the channels are updated to permit the scanning process to adaptively allocate resources to the most promising channels, enabling a fast identification of such channels. In addition, the out-of-band scanning can employ an additional scheme that is tailored to sensing abrupt changes between iterations of the scanning process. This additional scheme can account for the scenario in which a PU returns to one or more of the candidate channels, thereby further improving the efficiency of the method, as the scheme enables quick detection of occupied channels that the main scanning process may not identify. Thirdly, an SSCT-based out-of-band searching process can be applied that leads to significant gains on reducing the time to resume secondary transmission. The sensing scheme permits SUs to reliably and quickly switch to a free spectrum band when necessary while maintaining a good QoS for PUs as well as SUs. Compared with the fixed-sample-size detection schemes, such as energy detection, the embodiments utilize a much lower scanning time on each channel, which leads to a higher scanning performance.

Embodiments described herein may be entirely hardware, entirely software or including both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or a semiconductor system (or apparatus or device) or a propagation medium. The medium may include a computer-readable storage medium, such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

1. Cognitive Radio Systems

Figure 1:
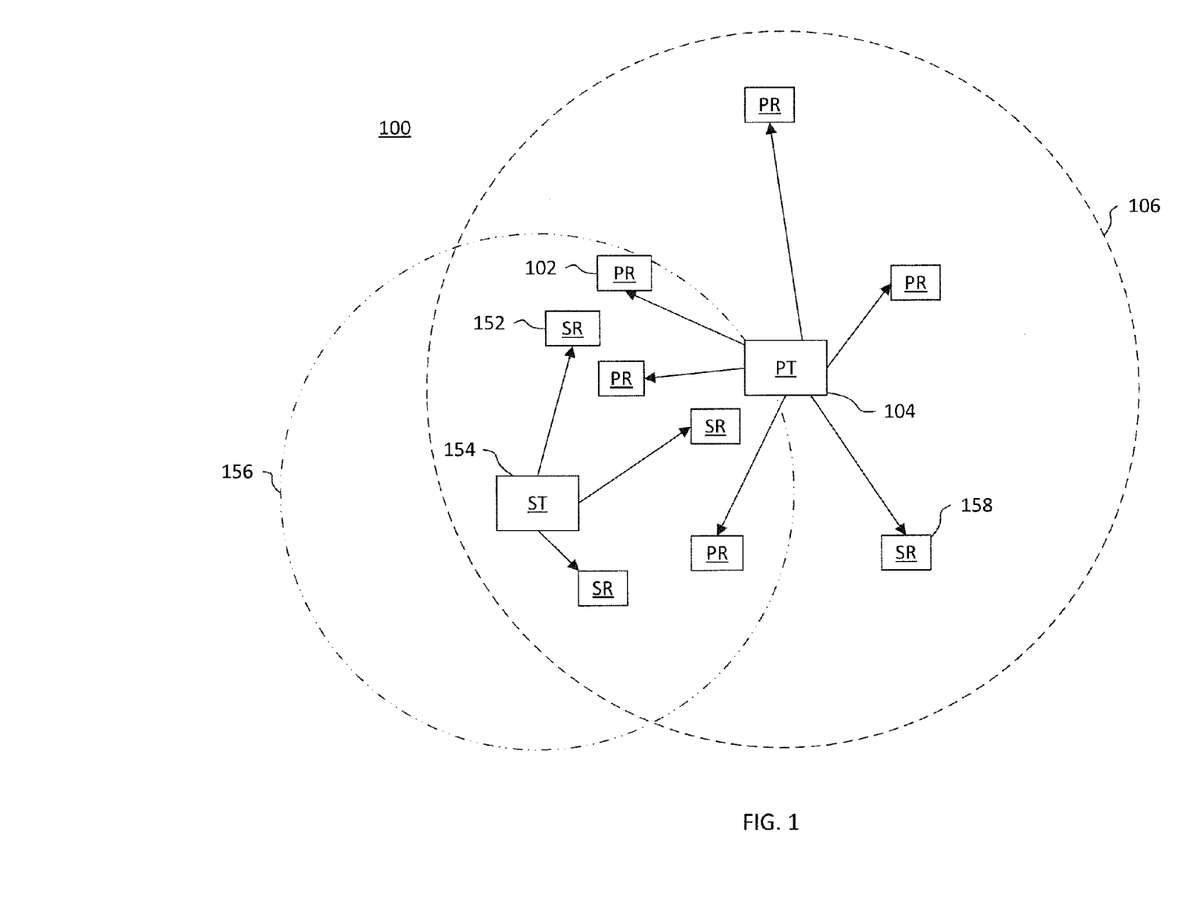
FIG. 1 is a block diagram of a communication system in accordance with an exemplary embodiment.

Referring now to the drawings in which like numerals represent the same or similar elements and initially to FIG. 1, an exemplary communication system 100 in which embodiments of the present principles can be implemented is illustrated. The system 100 can include a plurality of transmitters. For example, the system can include one or more primary transmitters 104 and one or more secondary transmitters 154. The primary transmitter (PT) 104 can be configured to service and transmit data signals to primary receivers (PRs) 102, while the secondary transmitter (ST) 154 can be configured to service and transmit data signals to secondary receivers (SRs) 152. In addition, in certain exemplary implementations, the primary transmitter 104 can be configured to service one or more secondary receivers 158. Here, a primary transmitter and a primary receiver, collectively referred to as a "primary user," are "licensed" in the sense that they have exclusive rights to utilize and communicate on certain sets of spectrum bands, denoted as primary spectrum bands. In turn, second transmitters and secondary receivers are "unlicensed" in the sense that they have limited access to the primary spectrum bands and cannot interfere with transmissions by primary transmitters or receivers on the primary spectrum bands.

In the embodiment illustrated in FIG. 1, the primary transmitter 104 services primary receivers 102 (and possibly secondary receivers 158) within the area 106, while the secondary transmitter 154 services secondary receivers 152 within the area 156, which can overlap with the area 106. The secondary transmitter 154 and the secondary receivers 152 can utilize spectrum hole detection methods described herein to determine the presence or absence of primary receivers 102 activity on their allocated spectrum bands. In addition, in accordance with other exemplary aspects, the primary transmitter 104 can service secondary receivers 158 on subbands that it knows are unoccupied by the primary receivers 102 that it services. Alternatively, where the service area 106 of the primary transmitter 104 overlaps with the service area of another primary transmitter (e.g., another primary transmitter that utilizes different bands than the primary transmitter 104), then the secondary receiver 158 and the transmitter 104 can use the detection methods to determine whether spectrum bands assigned by the other primary transmitter to its primary receivers are free or occupied.

Figure 2:
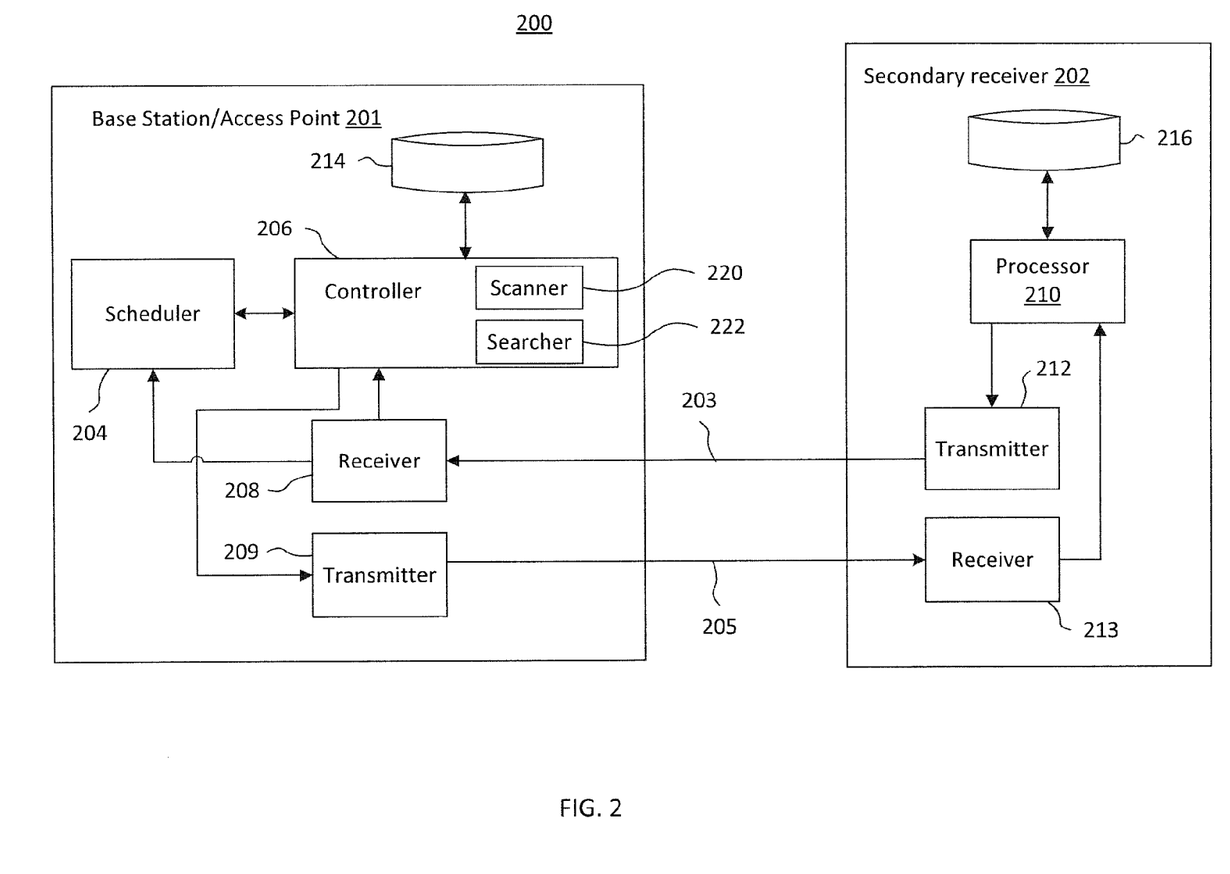
FIG. 2 is a block diagram of a cognitive radio system for serving secondary receivers in accordance with an exemplary embodiment.

Referring to FIG. 2, with continuing reference to FIG. 1, a communication system 200 is provided to illustrate more detailed aspects of the elements of the system 100. For example, the system 200 can include a transmitter 201 that services and transmits data signals to a receiver 202. The transmitter 201 is one exemplary implementation of the transmitters 104 and 154 and can be implemented as a base station or an access point. Similarly, the receiver 202 is one exemplary implementation of the receivers 152 and 158. The transmitter 201 can include a controller 206, a storage medium 214, a scheduler 204, a receiver 208 and a transmitter 209. The controller 206 can control the operations of the other elements of the transmitter 201. Here, the controller 206 can utilize the storage medium 214 to store a program of instructions that implement one or more aspects of the spectrum sensing methods described herein. The receiver 208 can be configured to receive uplink transmission signals along the uplink 203, while the transmitter 209 can be configured to transmit downlink signals along the downlink 205. Further, the controller 206 can employ a scheduler 204 to schedule and allocate resource blocks (e.g., subcarriers) to the receivers that the transmitter 201 services. The controller 206 can include a scanner 220 and a searcher 222 that can implement aspects of method embodiments for detecting portions of an available spectrum that are not used by primary users, as described in more detail herein below. The scanner 220 and the searcher 222 can be configured to provide in-band and out-of-band functionality. In turn, the receiver 202 can follow an SP and TxP structure that is controlled by the controller 206 of the transmitter 201. The receiver 202 can include a processor 210, a storage medium 216, a receiver 213 and a transmitter 212. The processor 210 can control the operations of the other elements of the receiver 202. In addition, the processor 210 can utilize the storage medium 216 to store a program of instructions that implement one or more aspects of the spectrum sensing methods described herein. The transmitter 212 can be configured to transmit uplink transmission signals along the uplink 203, while the receiver 213 can be configured to receive downlink signals along the downlink 205. Each of the transmitters 212 and 209 and each of the receivers 213 and 208 include antenna and other related processing circuitry. Additional functions of various elements of the transmitter 201 and the receiver 202 are described in more detail herein below with respect to method embodiments.

2. System Model

For illustrative purposes, a cognitive radio system with a single secondary user is considered. Here, the secondary user or user system can comprise the base station 201 and one or more secondary receivers 202. The secondary base station (or AP) 201, which serves a secondary receiver 202, performs in-band sensing to observe its currently occupied channel during SP and performs out-of-band sensing to identify candidate channels during TxP. The purpose of out-of-band sensing is to shorten the switching (evacuation) time for the secondary base station (SBS) 201 when PUs return to the spectrum band currently being used by the SBS 201.

Figure 3:
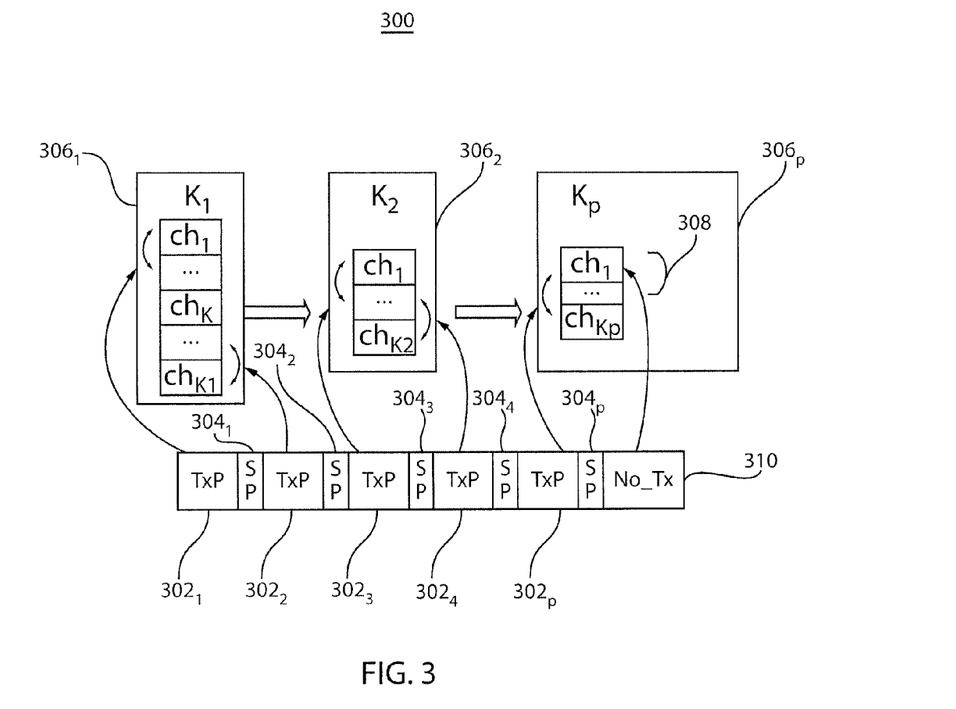
FIG. 3 is a block/flow diagram illustrating an implementation of scanning and searching phases in accordance with an exemplary embodiment.

With reference now to FIG. 3, an overview of multiple stages of a spectrum sensing method comprising sequential in-band sensing and progressive out-of-band sensing is illustratively depicted. During searching and scanning, given a large number of spectrum bands and limited sensing resources, the optimal strategy is to allocate as much sensing resources as possible to the possibly empty channels. To this end, the method applies a scanning algorithm that progressively removes the channels which are presumably being occupied while maintaining a short list of most likely empty channels. Here, sensing resources are adaptively allocated to spectrum bands, which are progressively refined in an iterative process. The SBS 201 occupies a license band k until a PU appears. K is a list of candidate channels for which channel scanning is carried out during TxP. As soon as the sequential in-band sensing method detects the presence of a PU on the band k, the searching process is triggered to locate the most promising channel for fast channel evacuation.

As illustrated in FIG. 3, the transmitter 201 and the receiver 202 communicate during a first transmission period $302_1$ on one or more channels reserved for a primary user. In this example, all the transmission periods $302_1$-$302_p$ illustrated include transmissions that are made on the same channel(s). At the start of the transmission period $302_1$, the list $306_1$ of candidate channels includes $K_1$ channels: $ch_1 \ldots ch_{K1}$. The system performs scanning to quickly find and remove channels that are deemed to be occupied by primary users. A more detailed description of the scanning and searching processes is provided below. Subsequently, as noted above, the system undergoes a sensing/quiet period $304_1$ at which the secondary base station 201 searches for primary users on the channel(s) on which the transmissions of the transmission periods are made. If the channel(s) is still unoccupied, the system proceeds to a second transmission period $302_2$ and undergoes further scanning to reduce the listing to $K_2$ candidate channels: $ch_1 \ldots ch_{K2}$. The process repeats through the intermittent transmission periods $302_2$-$302_p$ and sensing periods $304_2$-$304_p$ so that a refined listing $306_p$ of candidate channels is obtained. As described in more detail herein below, the listing $306_p$, should have a minimum number of channels $K_{MIN}$ 308. In this example, a primary user is detected during sensing period $304_p$ and, as a result, transmissions between the base station 201 and the secondary receiver 202 are ceased and a searching operation is performed through the remaining, refined listing $306_p$ during period 310 to find a new channel on which the secondary receiver 202 and the base station 201 can communicate.

Figure 4:
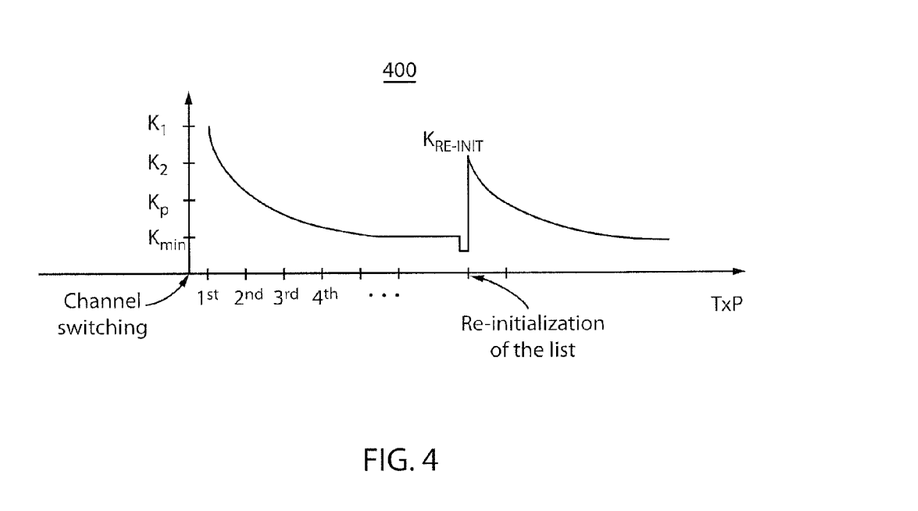
FIG. 4 is a graph illustrating the operation of a progressive out-of-band scanning scheme in a static case in accordance with an exemplary embodiment.

FIG. 4 provides a graph 400 that shows the operation of the progressive out-of-band scanning scheme in a static case. In the static case, the status of a channel is unknown at the beginning of scanning period and remains unchanged during the scanning and searching process. We assume that there are total $K_1$ candidate channels indexed by k at the beginning of the first TxP after the channel switching. Each loop of the out-of-band scanning process in a TxP can be quickly completed with only a relatively small number of samples. Although the measurement of each loop is coarse and noisy, channels including strong signals can be readily detected. For appropriate iterations, the measurement of each channel aggregates considerable samples with which the test statistic enables the detection of low level signals by PUs. In each loop, the scanning process eliminates possibly occupied spectrum bands exceeding a threshold while preserving a reduced portion of spectrum bands that are carried to the additional investigation during the following TxPs. The collected samples are further examined after they are merged with the samples from the previous iterations. As indicated above, the scanning process is followed by the searching process in FIG. 3, triggered by the detection of a PU on the currently used spectrum band s. To ensure immediate evacuation by SUs, spectrum searching should promptly determine the empty channel over considerably reduced spectrum lists $K_{min}$ obtained by the scanning operation. In the searching phase, the SU system can accurately identify and select the best spectrum band satisfying the quality of service specifications because the most promising spectrum bands have been previously examined. Recall that there are total K candidate channels. At channel k, the received signal samples conform to one of the following two hypotheses $$H_{0,k}: y_{i,k} = w_{i,k} \quad (1)$$

$$H_{1,k}: y_{i,k} = s_{i,k} + w_{i,k} \quad (2)$$

where $y_{i,k}$ denotes the ith received signal sample at channel k, $s_{i,k}$ denotes the ith primary signal sample at channel k, and $w_{i,k}$ is additive white Gaussian noise (AWGN).

3. In-Band Sensing

The purpose of in-band sensing is to quickly determine whether the channel currently occupied by the secondary base station is indeed free or whether the status of the channel currently occupied by the secondary base station has been changed. A maximum tolerance interference time $T_{int}$ can be used as a hard protection time for PUs. It is considered safe for a PU if the secondary transmission does not exceed the time limit $T_{int}$ on the channel. There are two possible scenarios for which in-band sensing may be applied. The first scenario is that the currently occupied channel is busy from the beginning, e.g., the SU switches to a busy channel by mistake. The second scenario is that PUs return to the channel. In both cases, the SU should quickly determine whether the currently occupied channel is indeed used by a primary user or still remains empty. In the exemplary embodiments described herein, two viable options can be employed: cumulating sum (CUSUM) and repeated sequential shifted chi-square test (SSCT).

To this end, a cumulating sum (CUSUM) algorithm can be applied for change point detection. In the CUSUM algorithm, the test statistic is updated recursively as follows $$S_i = \max\left\{S_{i-1} + \log\frac{p_1(y_i)}{p_0(y_i)}, 0\right\} \quad (3)$$

where $p_1$ and $p_0$ are probability density functions under $H_0$ and $H_1$, respectively, $y_i$ denotes a received signal sample, and $S_1$ is defined as $$S_1 = \max\left\{\log\frac{p_1(y_1)}{p_0(y_1)}, 0\right\}.$$

The probability density function $P_1$ and $P_0$ are determined from (1) and (2).

The stopping rule is given by $$t_s = \min\{i : S_i \geq h\}$$

where h is an appropriately chosen threshold such that the corresponding channel on which the samples $y_i$ are obtained is deemed to be occupied by a primary user if $S_1$ or any $S_i$ is greater than or equal to h.

Alternatively, other sequential algorithms such as repeated. SSCT can also be applied. Here, the repeated SSCT algorithm can be applied by determining the test statistics as follows:

$$\Lambda_i = \max\{\Lambda_{i-1} + |y_i|^2 - \Delta, -\epsilon\} \quad (4)$$

where $\epsilon$ is a small non-negative number, and $\Lambda_1$ is given by $$\Lambda_1 := \max\{|y_i|^2 - \Delta, -\epsilon\}.$$

Similar to CUSUM, the stopping rule of the repeated SSCT is given by $$t_s = \min\{i : \Lambda_i \leq \eta\}$$

where $\eta$ is an appropriately chosen threshold such that the corresponding channel on which the samples $y_i$ are obtained is deemed to be occupied by a primary user if $\Lambda_1$ or any $\Lambda_i$ is greater than or equal to $\eta$. Compared with CUSUM algorithm, the repeated SSCT has simpler test statistics and has less implementation complexity.

4. Out-of-Band Sensing

Out-of-band sensing consists of two phases: scanning and searching. In the scanning phase, we consider two cases: 1) static case and 2) dynamic case. In the static case, the statuses of candidate channels remain unchanged during the scanning phase while in the dynamic case, the statuses of candidate channels may change during the scanning phase.

With regard to the static case, recall that there are a total $K_1 (=K-1)$ candidate channels after a channel switching. Suppose that a TxP is the length of $N_t T_s$ seconds with $T_s$ denoting the sampling period in seconds. $N_t$ is a number of collected samples. Without loss of generality, we assume that $N_t$ a multiple of $K_1$, i.e., $N_t = M_j K_1$, where $M_j$ is an integer. Let $K_1$ be the set of the channel indices. Without loss of generality, we consider $K_1 := \{1, \ldots, K_1\}$. Let $\pi_k^{(0)}$ be the prior probability of channel k being free. The prior probability of channel k being free can be obtained via communication with primary user systems. In many cases of practical interest, primary user systems have occupation data of their spectrum. Secondary systems can obtain this data via a communication with primary user systems to determine the prior probability of channel k being free $\pi_k^{(0)}$.

At the end of the first TxP, the system collects $M_1$ received signal samples from each channel. Let $y_k^{(1)}$ denote the $M_1 \times 1$ received signal vector, i.e., $y_k^{(1)} = [y_{1,k}^{(1)}, \ldots, y_{M_1,k}^{(1)}]$, where $y_{i,k}^{(1)}$ is the ith received signal sample at channel k during the first TxP. Here, the superscript is used to denote the index of TxP, $M_1$ denotes the length of $y_k^{(1)}$, and the subscript k is the channel index. Let $\pi_k^{(1)}$ denote the posterior probability that the channel is free after $y_k^{(1)}$ is observed. The posterior probability $\pi_k^{(1)}$ can be computed as follows $$\pi_k^{(1)} = P(H_0 \mid y_k^{(1)}) = \frac{\pi_k^{(0)} p_0(y_k^{(1)})}{\pi_k^{(0)} p_0(y_k^{(1)}) + (1 - \pi_k^{(0)}) p_1(y_k^{(1)})}.$$

The system sorts the posterior probability $\pi_k^{(1)}$, k=1, ..., $K_1$, in descending order. The first $K_2$ channels, which can be a pre-determined number set prior to implementation of the method, is chosen from the sorted list for subsequent observations. Let $K_2$ be the index set of the channels for subsequent observations. Clearly, the cardinality of $K_2$ is $K_2$ and the index set of the channels that are removed from $K_1$ is $K_1/K_2$.

Clearly, we have $K_2 \leq K_1$. From the second TxP, the channels that have relatively large $\pi_k^{(1)}$ will be observed. Thus, the list size can be reduced. Since the length of a TxP is fixed in this example, the sensing time allowable and applied for each channel will increase for the second. TxP. Let $M_2$ be the received samples collected in the second TxP. At the end of the second TxP, we obtain $$\pi_k^{(2)} = P(H_0 \mid y_k^{(2)}) = \frac{\pi_k^{(1)} p_0(y_k^{(2)})}{\pi_k^{(1)} p_0(y_k^{(2)}) + (1 - \pi_k^{(1)}) p_1(y_k^{(2)})}$$

where $y_k^{(2)}$ denotes the $(M_1+M_2) \times 1$ vector over channel k at the end of the second TxP, which consists of $M_1+M_2$ received signal samples observed during the first and second TxPs. The posterior probability $\pi_k^{(2)}$, k=1, ..., $K_2$ is sorted in descending order and the first $K_3$, which is also a pre-determined number, channels is maintained in the sorted list. Clearly, we have $K_3 \leq K_2$. In a similar manner, the posterior probabilities $\pi_k^{(3)}$ are updated for the channels in the sorted list. Generally speaking, the posterior probability $\pi_k^{(i)}$ at the end of the ith TxP (here, i is the index of TxP) is updated as follows $$\pi_k^{(i)} = P(H_0 \mid y_k^{(i)}) = \frac{\pi_k^{(i-1)} p_0(y_k^{(i)})}{\pi_k^{(i-1)} p_0(y_k^{(i)}) + (1 - \pi_k^{(i-1)}) p_1(y_k^{(i)})}, \quad (5)$$

$$k = 1, \ldots, K_i$$

where $y_k^{(i)}$ is the received signal vector at channel k at the end of the ith TxP. The number of the candidate channels at the end of the ith. TxP is denoted by $K_i$, where $K_1 \geq K_2 \geq \ldots K_i$. Suppose that the system will maintain a list of size $K_{min}$ after a certain number of TxPs.

With regard to the dynamic case, if no PUs return to any candidate channels in the list, a list of candidate channels with high likelihood of being free will be obtained in a progressive manner. However, because in practice it is possible that PUs return to some candidate channels in the list, a change point detection method for the candidate channels should be applied after a certain point to account for this possibility and thereby improve the efficiency of the searching procedure when a new channel is needed. One possible change point detection method is similar to the CUSUM test mentioned above. Specifically, the system can compute $S_{l,k}$ as follows $$S_{l,k} = \max\left\{S_{l-1,k} + \log \frac{p_1(y_{l,k})}{p_0(y_{l,k})}, 0\right\}, k = 1, 2, \ldots, K_p, l = 2, \ldots$$

where $S_{l,k}$ is defined as $\log(p_1(y_{l,k})/p_0(y_{l,k}))$ where l is the index of the received signal samples. If $S_{l,k} > h$ for some channel k, the SU system removes such channels from the list and will not perform Eq. (5) for these channels.

In practice, it is often difficult to obtain an exact value for $\pi_k^{(i)}$. Thus, the system can apply B-SSCT for the weak signals from the incumbent PU along with repeated SSCT as an alternative option. The repeated SSCT algorithm has been described above in Section 3. In B-SSCT, the test statistics at channel k are given as follows $$\Lambda_k^{(i)} = \sum_{l=1}^{M_{i,k}} (|y_{l,k}|^2 - \Delta), k = 1, \ldots, K_i$$

where $M_{i,k}$ is defined as $M_1+M_2+\ldots+M_i$. When $\Lambda_k^{(i)}$ is larger than an appropriately chosen threshold for some channel k, the corresponding channels will be removed from the list. From a practical viewpoint, a change point detection algorithm is applied when a relatively small list of the candidate channels is obtained. Without loss of generality, it can be assumed that when the list size is reduced to $K_c$, the system starts to apply a change point detection method to detect possible abrupt changes among $K_c$ channels, where $K_c$ satisfies $K_{min} \leq k_c \leq K_1$.

The progressive sensing method progressively increases the probability that the list is composed of free channels. The channels in the final list will be candidate channels for the searching process that starts when one of the following cases holds: case 1) PUs return to the currently occupied channel; and case 2) the deadline is reached but the SU system is not able to determine the updated status of the currently occupied channel. Whenever the channel detection method indicates that PUs return to some of the candidate channels in the list, these channels will be removed from the list. When the number of the candidate channels in the list is less than $K_{min}$, the system can add additional channels with high $\pi_k^{(0)}$ from the index set $K_1/K_2$ into the list such that the list size maintains the size $K_{min}$. For example, at the pth TxP, there are ($K_{min}$−2) channels in the list. Then, two channels with highest or the second highest $\pi_k^{(0)}$ will be chosen from the index set $K_1/K_2$ to add to the list such that the list size remains $K_{min}$. An important goal of the progressive scanning is to obtain a small sized list, in which channels are likely to be free such that the final searching process can complete in a quick and accurate manner. The searching process is described herein below.

5. The Searching Process

As mentioned above, the SBS 201 should locate a free channel when PUs return to the channel currently occupied by the SBS 201. It can be assumed that the search process is constrained to complete within $N_l T_s$ seconds, where the maximum number of samples collected during the search process is $N_l$. Without loss of generality, it can also be assumed that there are $K_{min}$ candidate channels in the list after the pth TxP when the search process starts, and the search process ends when the search process completes or a maximally allowable searching time is reached. Systems in which there are no strict deadlines for the search process and in which parameters used in search algorithms are determined by an exhaustive search algorithm impose a high computational complexity and are not suitable for on-line computation. Here, the search process can be constrained to complete within $T_s$, and a priori probabilities are not determined until the search process starts due to the randomness of primary traffic and channel characteristics. To accommodate these needs, the system applies a search algorithm that does not require on-line determination of the parameters. With a slight abuse of notation, $\pi_k^{(0)}$, k=1, ..., $K_{min}$, is used to denote the posterior probabilities obtained at the beginning of the searching process and $\pi_k^{(i)}$, k=1, ..., $K_{min}$, is used to denote the posterior probabilities after collecting i samples. Since the SBS 201 has a single detector in this example, one sample is collected at a time. Here, the posterior probability $\pi_k^{(0)}$ is determined at the end of the previous scanning process. After collecting a sample, the system updates the posterior probability at the corresponding channel. The superscript is the sample index collected during the searching process, which can be performed in accordance with the algorithm of Table 1 below.

TABLE 1

Searching Algorithm 1) for $i \leftarrow 0$ to $N_l$;
2) Pick the channel that has the largest posterior probability $\pi_k^{(i)}$ among $K_{min}$ channels. Let $k_i$ be the index of the channel that has the largest posterior probability after collecting the ith sample, i.e., $$k_i = \underset{k}{\operatorname{argmax}} \pi_k^{(i)};$$

3) If $\pi_{k_i}^{(i)} > \eta th$, where $\eta th$ is an appropriately chosen threshold, jump to Step 5); If not, collect a sample $y_{k_i}^{(i+1)}$ from channel $k_i$ and update $\pi_k^{(i+1)}$ for $k = 1, \ldots, K_{min}$ as follows $$\pi_k^{(i+1)} \begin{cases} \dfrac{\pi_{k_i}^{(i)} p_0(y_{k_i}^{(i+1)})}{\pi_{k_i}^{(i)} p_0(y_{k_i}^{(i+1)}) + (1 - \pi_{k_i}^{(i)}) p_1(y_{k_i}^{(i+1)})}, & k = k_i \\ \pi_k^{(i)}, & k \neq k_i \end{cases} \quad (6)$$

4) return Step 1);
5) If $i \leq N_l$, return channel $k_i$ as $k_{best}$; end search; otherwise, return NULL.

In practice, computing the update $\pi_k^{(i+1)}$ may not be feasible due to the lack of knowledge on primary signals. In this situation, the system can apply an alternative search algorithm that is based on SSCT. Let $\Lambda_k^{(0)}$, $k=1, \ldots, K_{min}$ be the test statistics when the searching process starts and $\pi_k^{(i)}$, $k = 1, \ldots, K_{min}$ be the test statistics when i samples are collected. A search algorithm that is based on SSCT is described in Table 2 below.

TABLE 2

Searching Algorithm based on SSCT 1) for $i \leftarrow 0$ to $N_l$;
2) Pick the channel that has the smallest test statistic $\Lambda_k^{(i)}$ among $K_{min}$ channels. Let $k_i$ be the index of the channel that has the largest posterior probability after collecting the ith sample, i.e., $$k_{best} = \underset{k}{\operatorname{argmax}} \Lambda_k^{(i)};$$

3) If $\Lambda_{k_i}^{(i)} < a_{th}$ where $a_{th}$ is an appropriately chosen threshold, jump to Step 5); If not, collect a sample $y_{k_i}^{(i+1)}$ from channel $k_i$ and update $\Lambda_k^{(i+1)}$ for $k = 1, \ldots, K_{min}$ as follows $$\Lambda_k^{(i+1)} = \begin{cases} \Lambda_k^{(i)} + |y_{k_i}^{(i+1)}|^2 - \Delta, & k = k_i \\ \Lambda_k^{(i)}, & k \neq k_i \end{cases} \quad (7)$$

4) return Step 1);
5) If $i \leq N_l$ return $k_i$ as $k_{best}$; otherwise, return NULL.

6. Exemplary Method Implementations

Figure 5:
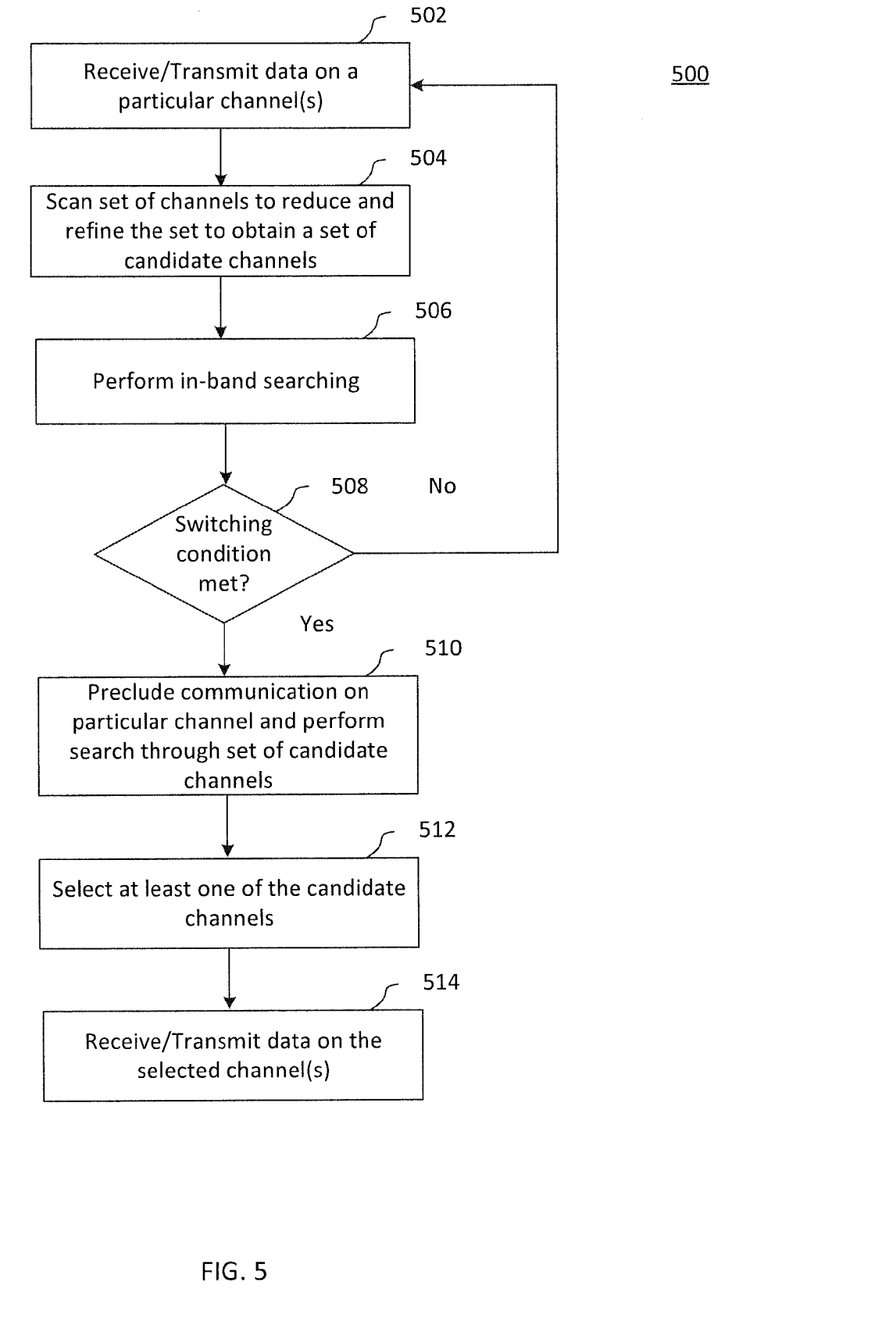
FIG. 5 is a block/flow diagram of an exemplary method for detecting one or more channels that is unused by primary users in a cognitive radio system in accordance with an exemplary embodiment.

Turning now to FIG. 5, an exemplary method 500 for detecting one or more channels that is unused by primary users in a cognitive radio system is illustratively depicted. It should be noted that each of the aspects of the present principles described above can be implemented in the method 500. Further, one or more aspects of the method 500 can be implemented in a computer program product, described above. Moreover, it should be understood that, although the scanning, searching and selection of channels are described as being performed by the SBS 201, variations of the method 500 are encompassed by the present principles.

The method 500 can begin at step 502, at which the secondary base station 201 can communicate on a particular channel in the cognitive radio system. For example, the secondary base station 201 can transmit signals on the particular channel to a receiver 202 through the transmitter 209, or the secondary transmitter 201 can receive signals through the receiver 208 on the particular channel from the receiver 202. As stated above, the communication on a particular channel can be implemented on periodic intervals of TxP.

At step 504 the scanner module 220, which can be implemented by the controller 206 of the secondary base station 201, can scan a set of channels to reduce and refine the set to obtain a set of candidate channels. For example, as described above in Section 3, a set or listing of channels can be iteratively scanned by collecting samples for each channel in the set of channels and for each iteration of the scanning. Furthermore, iterations of the scanning, which can occur during each periodic TxP interval, progressively removes channels from the set of channels based on the collected samples and updates states of the channels in the set based on the collected samples to obtain a set of candidate channels, as described above. For example, the scanner 220 can collect samples $y_k^{(p)} = [y_{1,k}^{(p)}, \ldots, y_k^{(p)}]$ for channels k in a given iteration p to obtain posterior probability values $\pi_k^{(p)}$ for channel k to select the $K_p$ channels with the highest posterior probabilities to remain in the listing. Alternatively, the scanning module 220 can employ B-SSCT or SSCT, as described above, to refine the listing. Furthermore, as stated above, a total number, M, of the samples collected for each of the channels in the set of channels in a given iteration of the scanning increases progressively as the iterations of the scanning progressively removes channels from the set of channels. In addition, the scanner 220 can remove a given channel from the set based, at least in part, on samples collected for the given channel in at least one previous iteration of the iterations. For example, as noted above, the posterior probability $\pi_k^{(p)}$ can be computed based on current samples taken on channel k in a current iteration as well as posterior probability $\pi_k^{(p-1)}$, which is based on samples collected on channel k during previous iterations of the scanning. Moreover, the scanner 220 can implement the scanning using a plurality of different procedures in a given iteration. For example, as noted above, the scanner 220 can obtain samples in a listing of a given iteration and determine posterior probabilities or determine test statistics in accordance with B-SSCT or SSCT to select which channels to remove from the listing. Further, as also stated above, the scanner 220 can be configured to account for the possibility of primary users returning to channels in the candidate listing. For example, to determine whether any primary users have returned to a given channel in a given listing, the scanner 220 can apply the change point detection method, as described above in Section 4, in the same iteration in which posterior probabilities, or B-SSCT or SSCT tests statistics are determined for the given listing. For example, the scanner 220 can determine the following statistic to assess whether a given channel k should be removed from the listing of candidate channels:

$$S_{l,k} = \max\left\{S_{l-1,k} + \log\frac{p_1(y_{l,k})}{p_0(y_{l,k})}, 0\right\}, k = 1, 2, \ldots, K_p, l = 2, \ldots$$

where $S_{l,k}$ is defined as $\log(p_l(y_{l,k})/p_0(y_{l,k}))$ and where l is the index of the received signal samples. Here, the change point detection method, relative to the methods based on posterior probability, B-SSCT or SSCT, is better adapted to identify abrupt sample characteristic changes between iterations to detect that a primary user has utilized one of the channels in the listing for data communication.

At step 506, the searcher module 222, which can be implemented by the controller 206 of the secondary base station 201, can perform in-band searching to determine whether a PU has returned to the particular channel on which communications have been made at step 502. Here, the channel can be evaluated to determine whether the primary user has utilized the channel. The evaluation can be performed during, for example, sensing/quite periods that are between TxP periods, as described above. As noted above, the in-band sensing can be implemented by using CUSUM, B-SSCT or SSCT schemes.

At step 508, the searcher module 222 can determine whether a switching condition has been met. If the switching condition has not been met, then the method proceeds to step 502 and repeats to implement another iteration of data communication and scanning. Otherwise, the method proceeds to step 510. For example, it at step 506, the searcher module 222 obtains samples on the channel and computes a test statistic based on the samples that exceeds a threshold, indicating that a primary user has returned to the channel, then the searcher module 222 can determine that the switching condition has been met. In addition, as indicated above, the searcher module 222 can also assess whether a maximum tolerance interference time $T_{int}$ has passed since the secondary base station 201 has begun transmissions on the channel. If so, then the searcher module 222 will also determine that a switching condition has been met.

If the searcher module 222 determines that a pre-determined switching condition has been met, then the searcher module 222 can proceed to step 510 and can preclude communications on the particular channel(s) and can perform a search through the set of candidate channels as described above. At step 512, the searcher module 222 selects at least one of the candidate channels in the set. For example, searcher module 222 can apply the algorithm described in Table 1 or the algorithm described in Table 2 to implement the search and selection, as described above in section 5.

At step 514, the secondary base station 201 can communicate data on the selected channel(s). For example, the secondary base station/access point 201 can transmit signals on the selected channel(s) to the receiver 202 through the transmitter 209, or the secondary base station/access point 201 can receive signals through the receiver 208 on the selected channel(s) from the receiver 202.

Figure 6:
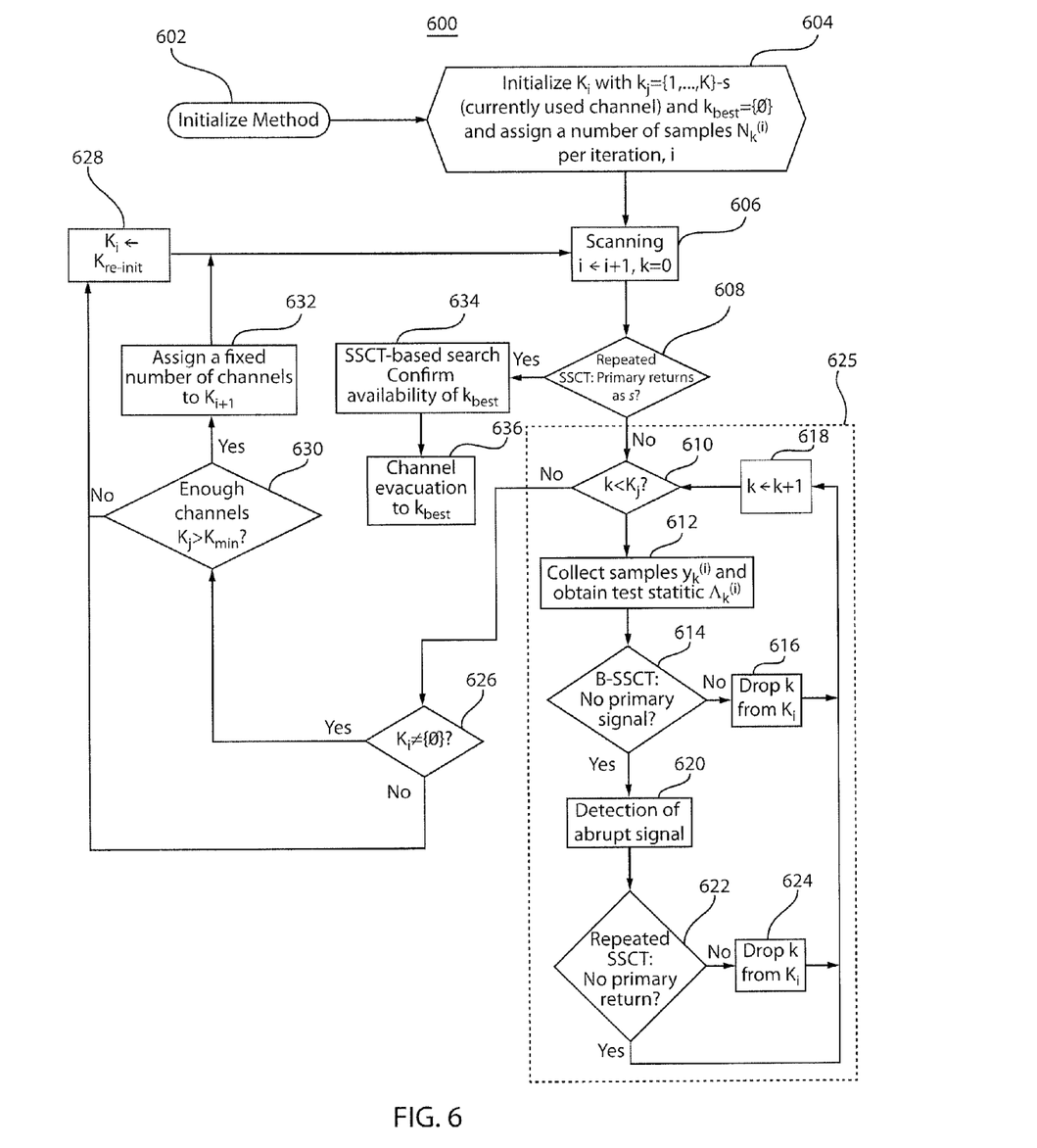
FIG. 6 is a block/flow diagram of a more specific method for detecting one or more channels that is unused by primary users in a cognitive radio system in accordance with an exemplary embodiment.

Turning now to FIG. 6, with continuing reference to FIGS. 2 and 5, a more specific embodiment 600 of a method for detecting one or more channels that is unused by primary users in a cognitive radio system is illustratively depicted. The method 600 is one implementation of the method 500. The method 600 can begin at step 602 in which the method 600 is initialized. For example, given the entire set of channels indexed by $\{1, \ldots, K\}$, the scanner 220 and the searcher 222 are requested to identify the best quality channel denoted by $k_{best}$.

At step 604, which can be implemented at step 504, the scanner 220 assigns all channels except a currently used channel s to $K_i$, where $K_i$ is a list of candidate channels for out-of-band scanning. An iteration parameter is initialized to zero and a minimum number of samples collected at each channel per iteration i, $M_i$, is initialized to a pre-defined constant.

At step 606, which can be implemented at step 504, the scanner 220 indexes the channels in $K_i$ by $k=\{1, \ldots, K\}-s$.

Scanning iteration begins with the following assignment of the variables i, k and $k_{best}$: iteration i=1, channel index k=0 and $k_{best}=\emptyset$.

At step 608, which can be implemented at step 506, the searcher 222 can perform repeated SSCT in-band sensing by monitoring s during a sensing period and can determine the presence of a primary user at the end of the sensing periods. The searcher 222 can compute $\Lambda_i$ with the stopping rule given by $t_s=\min\{i:\Lambda_i \geq \eta\}$, as noted above in section 3. If, at step 608, the searcher 222 determines that a primary user has not returned to a channel utilized by the secondary user system 200, then the method can proceed to step 610.

At step 610, the scanner 220 can assess whether is k is less than $K_i$. If so, then the scanner 220 can proceed to step 612, at which it communicates with the receiver 208 to receive signal samples $y_k^{(i)}$, which are collected by the scanner 220 to obtain a test statistic $\Lambda_k^i$. Here, the scanner 220 can performs B-SSCT sensing, as described above in section 4. Alternatively or additionally, the posterior probability $\pi_k^{(i)}$ at the end of the ith TxP (here, i is the index of TxP) can be updated as follows $$\pi_k^{(i)} = P(H_0 | y_k^{(i)}) = \frac{\pi_k^{(i-1)} p_0(y_k^{(i)})}{\pi_k^{(i-1)} p_0(y_k^{(i)}) + (1-\pi_k^{(i-1)}) p_1(y_k^{(i)})},$$

$$k = 1, \ldots, K_i,$$

where $y_k^{(i)}$ is the received signal vector at channel k at the end of the ith TxP, as described above in Section 4. Steps 610 and 612 can be implemented at step 504.

At step 614, the scanner 220 determines whether there are any primary signals on the channels evaluated at preceding step 612. For example, the test statistic is compared to the threshold and if the test statistic surpasses the threshold, the channel is eliminated from $K_i$ at step 616. If the determined test statistic is lower than the threshold, the scanner 220 performs steps 610, 612 and 614 on the remaining channels in $K_i$ while increasing k to k+1 at step 618. Steps 614, 616 and 618 can be implemented at step 504 of the method 500.

If no PU returns to any candidate channels in the list, then the scanner 220 will obtain, in a progressive manner, a list of candidate channels with a high likelihoods of being free. However, because, in practice, it is possible that PUs return to some candidate channels in the list, the scanner 220 can perform a change point detection algorithm to detect possible abrupt changes for the candidate channels. Thus, if the scanner 220 determines at step 614 that there are no primary signals on the evaluated channel, when, for example, the test statistic does not exceed the threshold, then the scanner 220 proceeds to step 620 (which can be implemented at step 504), at which the scanner 222 can detect any abrupt signal changes between iterations. As noted above, the scanner 220 can compute $S_{l,k}$ as follows $$S_{l,k} = \max\left\{S_{l-1,k} + \log\frac{p_1(y_{l,k})}{p_0(y_{l,k})}, 0\right\}, k = 1, 2, \ldots, K_p,$$

$$l = 2, \ldots$$

where $S_{1,k}$ is defined as $\log(p_1(y_{l,k})/p_0(y_{l,k}))$ and where l is the index of the received signal samples. If $S_{l,k}>h$ for some channel k, the SU base station 201 removes such channels from the list.

Thus, the method can proceed to step 622, at which the scanner 220 determines whether the test statistic computed at step 620 has exceeded its corresponding threshold. For example, if the test statistic of the compilation of samples is compared to a threshold and if the test statistic exceeds the threshold, the channel is eliminated from $K_i$ at step 624. If the received power is lower than the threshold, then the scanner 220 performs steps 610, 612, and 614 on the remaining channels in $K_i$ while increasing k to k+1 at step 618. Steps 622 and 624 can be implemented at step 504 of the method 500.

After completing the scanning process for all channels in $K_i$, the searcher 222 can determine the most promising candidate channel among the possibly empty channels in $K_i$.

Returning to step 610, if the scanner 220 determines that is k is less than $K_i$, then the method can proceed to step 626, at which the scanner 220 determines whether there are any candidate channels remaining in $K_i$. If there is no candidate channel in $K_i$, then the scanner 220 reinitializes K at step 628. For example, the scanner 220 assigns all $K_{re\text{-}init}$ channels in $\{1, \ldots, K-1\}$ except s to $K_i$ and begins a new scanning iteration at step 606 with iteration i initialized to 0. Steps 626 and 628 can be implemented at step 504 of the method 500.

If the scanner 220 determines at step 626 that there are candidate channels remaining in $K_i$, then the scanner 220 determines at step 630 whether $K_i$ includes a sufficient number of channels $K_{min}$. Step 630 can be implemented at step 504 of the method 500. If there is not a sufficient number of channels $K_{min}$ in $K_i$, then the scanner 220, at step 632, inserts, into $K_i$, certain channels that were eliminated due to a detected higher signal at steps 614 and 616 and the scanning process repeats at step 606. Step 632 can be implemented at step 504 in the method 500. The scanning process ensures that there is a sufficient number of channels in $K_i$. If there are too many candidate channels that are deemed empty channels in an iteration, the scanning process maintains a fixed number of channels $K_{i+1}$, i.e. a number of channels that can be sensed in a transmission period, while discarding the remaining channels from the scanning candidates. By maintaining a minimum number of channels for further investigation, the scanning process accomplishes significant gains with respect to reducing sensing resources while providing the most promising channels quickly.

Returning to step 608, if the searcher 222 determines that a primary user has returned to the channel occupied by the SBS 201 and a secondary receiver 202, then the method can proceed to steps 634 and 636, at which the currently occupied channel is evacuated by the SBS 201 and the corresponding secondary receiver 202. For example, at step 634, which can be implemented at steps 510 and 512, the searching process is triggered with the presence of the primary users detected at the end of the sensing period. The searching procedure can be implemented with the procedures described above with respect to Tables 1 and/or 2 to select the best channel $k_{best}$. Here, the searcher 222 selects one or more channel(s) to which to evacuate the secondary user system, as described above. At step 636, which can be implemented at step 514, the searcher 222 can direct the secondary user system to evacuate to the selected channel(s) and to begin communication on the selected channel(s), as described above. The search process decides the best channel among the most promising bands obtained during the scanning process while ensuring its availability by collecting a minimum number of samples which enables seamless channel evacuation. If there is no selected candidate channel, then the method indicates that there is no free channel, proceeds to step 606 and repeats the scanning process.

It should be noted that block 625 can be alternatively implemented using posterior probability and the cumulating sum test (CUSUM), as described above, where the posterior probability can be used instead of B-SSCT and CUSUM for Repeated SSCT.

Given that multi-band cognitive radio networks include a number of candidate channels, the channel searching process is usually time critical to avoid QoS degradation to secondary communications. The multiple stage hybrid spectrum sensing schemes described herein provides secondary users with the means to enable a secondary user system to quickly and accurately locate the best quality channel when the secondary user system vacates its current channel.

Having described preferred embodiments of systems and methods for multiple stage hybrid spectrum sensing for cognitive radio (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for detecting at least one channel that is unused by a primary user in a cognitive radio system comprising:
communicating data on a particular channel for at least one secondary receiver;
iteratively scanning a set of channels by collecting samples for each channel in the set of channels and for each iteration of the scanning, wherein iterations of the scanning progressively removes channels from the set of channels based on the collected samples and updates states of the channels in the set based on the collected samples to obtain a set of candidate channels;
in response to detecting a pre-determined condition, precluding communications on the particular channel and evaluating at least one of the candidate channels by collecting additional samples on each of the at least one of the channels; and
selecting at least one of the evaluated candidate channels based on the evaluating for utilization by the at least one secondary receiver for data communication.

2. The method of claim 1, wherein a total number of the samples collected for each of the channels in the set of channels in a given iteration of the scanning increases progressively as the iterations of the scanning progressively removes channels from the set of channels.

3. The method of claim 1, wherein a given iteration of the iterations of the scanning removes a given channel from the set of channels based, at least in part, on samples collected for the given channel in at least one previous iteration of the iterations.

4. The method of claim 1, wherein the scanning further comprises applying a plurality of different procedures in a given iteration of the iterations to remove given channels from the set of channels.

5. The method of claim 4, wherein the plurality of different procedures includes a first procedure and a second procedure and wherein the second procedure, relative to the first procedure, is more adapted to identify abrupt sample characteristic changes between iterations to detect that the primary user has utilized one of the given channels for data communication.

6. The method of claim 1, wherein the communicating data is performed during periodic intervals and wherein the scanning is performed successively during the periodic intervals.

7. The method of claim 6, wherein the particular channel is excluded from the set of channels and wherein the method further comprises:
iteratively evaluating, during intervals that are between the periodic intervals, whether the primary user has utilized the particular channel.

8. A cognitive radio secondary user system comprising:
a transmitter device configured to transmit data on a particular channel;
a scanner module configured to iteratively scan a set of channels by collecting samples for each channel in the set of channels and for each iteration of the scan, wherein iterations of the scan progressively removes channels from the set of channels based on the collected samples and updates states of the channels in the set based on the collected samples to obtain a set of candidate channels; and
a searcher module configured to, in response to detecting a pre-determined condition, preclude communications on the particular channel and evaluate at least one of the candidate channels by collecting additional samples on each of the at least one of the channels, wherein the searcher module is further configured to select at least one of the evaluated candidate channels based on the evaluation to direct the transmitter device to transmit data transmissions on the selected channel.

9. The system of claim 8, wherein a total number of the samples collected for each of the channels in the set of channels in a given iteration of the scan increases progressively as the iterations of the scan progressively removes channels from the set of channels.

10. The system of claim 8, wherein a given iteration of the iterations of the scan removes a given channel from the set of channels based, at least in part, on samples collected for the given channel in at least one previous iteration of the iterations.

11. The system of claim 8, wherein the scanner module is further configured to apply a plurality of different procedures in a given iteration of the iterations to remove given channels from the set of channels.

12. The system of claim 11, wherein the plurality of different procedures includes a first procedure and a second procedure and wherein the second procedure, relative to the first procedure, is more adapted to identify abrupt sample characteristic changes between iterations to detect that a primary user has utilized one of the given channels for data communication.

13. The system of claim 8, wherein the transmitter device is configured to transmit the data on the particular channel during periodic intervals and wherein the scan is performed successively during the periodic intervals.

14. The system of claim 13, wherein the particular channel is excluded from the set of channels and wherein the searcher module is further configured to evaluate, during intervals that are between the periodic intervals, whether a primary user has utilized the particular channel.

* * * * *